(12) United States Patent
Hahn

(10) Patent No.: US 7,334,647 B2
(45) Date of Patent: Feb. 26, 2008

(54) ROTARY TOOL

(75) Inventor: Norbert Hahn, Hünstetten-Limbach (DE)

(73) Assignee: Black & Decker Inc., Newark, DE (US)

( * ) Notice: Subject to any disclaimer, the term of this patent is extended or adjusted under 35 U.S.C. 154(b) by 49 days.

(21) Appl. No.: 11/450,784

(22) Filed: Jun. 9, 2006

(65) Prior Publication Data

US 2006/0278417 A1 Dec. 14, 2006

(30) Foreign Application Priority Data

Jun. 10, 2005 (GB) .................................. 0511794.0

(51) Int. Cl.
*B25F 5/00* (2006.01)
*B25D 16/00* (2006.01)

(52) U.S. Cl. .................. 173/178; 173/48; 173/201; 173/216; 81/467; 81/473; 192/56.1; 192/56.56; 192/83

(58) Field of Classification Search ............. 173/48, 173/178, 176, 201, 216, 217, 104, 109; 81/473, 81/474, 467, 475; 192/17 C, 110 R, 83, 192/56.56, 56.1, 34, 69.8, 84.6, 56.54
See application file for complete search history.

(56) References Cited

U.S. PATENT DOCUMENTS

| | | | | |
|---|---|---|---|---|
| 3,616,883 A | * | 11/1971 | Sindelar | 192/56.61 |
| 4,548,305 A | * | 10/1985 | Anderson | 192/56.54 |
| 4,883,130 A | * | 11/1989 | Dixon | 173/178 |
| 5,025,903 A | * | 6/1991 | Elligson | 192/83 |
| 5,134,909 A | * | 8/1992 | Sasaki | 81/473 |
| 5,155,473 A | * | 10/1992 | Oketani et al. | 340/680 |
| 5,203,242 A | * | 4/1993 | Hansson | 81/469 |
| 5,346,023 A | * | 9/1994 | Takagi et al. | 173/178 |
| 5,738,177 A | * | 4/1998 | Schell et al. | 173/178 |
| 5,954,457 A | * | 9/1999 | Stock et al. | 408/6 |
| 6,035,945 A | * | 3/2000 | Ichijyou et al. | 173/48 |
| 6,478,095 B2 | * | 11/2002 | Neumaier | 173/48 |
| 6,557,648 B2 | * | 5/2003 | Ichijyou et al. | 173/48 |
| 6,644,450 B2 | * | 11/2003 | Kristen et al. | 192/17 C |
| 6,705,410 B2 | * | 3/2004 | Ziegler | 173/178 |
| 6,851,343 B2 | * | 2/2005 | Sasaki | 81/475 |
| 6,976,545 B2 | * | 12/2005 | Greitmann | 173/104 |

FOREIGN PATENT DOCUMENTS

GB         2 392 966 A      3/2004
WO    WO 2004/024398 A1   3/2004

* cited by examiner

*Primary Examiner*—Scott A. Smith
(74) *Attorney, Agent, or Firm*—Michael P. Leary; Charles E. Yocum; Adan Ayala

(57) ABSTRACT

An overload clutch assembly for a power tool having two torque settings through which rotary drive is transmitted to a spindle. The overload clutch assembly is capable of being between switched between the two torque settings by at least one actuator. The clutch assembly comprises a carrier rotationally mounted on a output clutch spindle; a first clutch plate operational for transmitting torque below a first level; and a second clutch plate operational for transmitting torque below a second level higher than the first; and characterised in that, when the overload clutch is in the higher torque setting, the torque is transferred from the carrier to the output clutch spindle via the second clutch plate only.

20 Claims, 8 Drawing Sheets

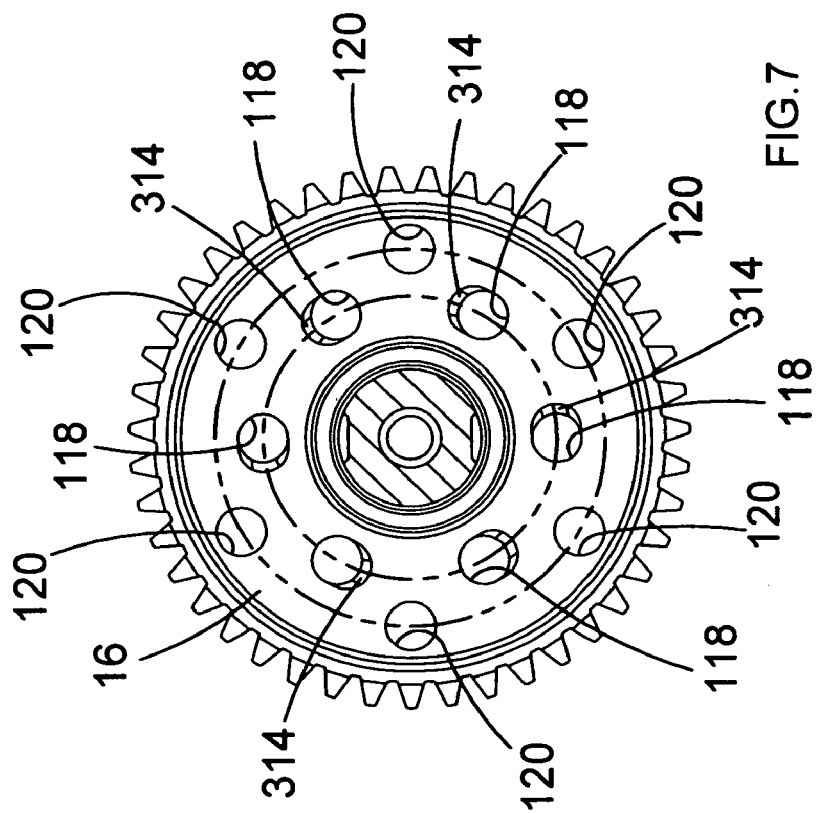
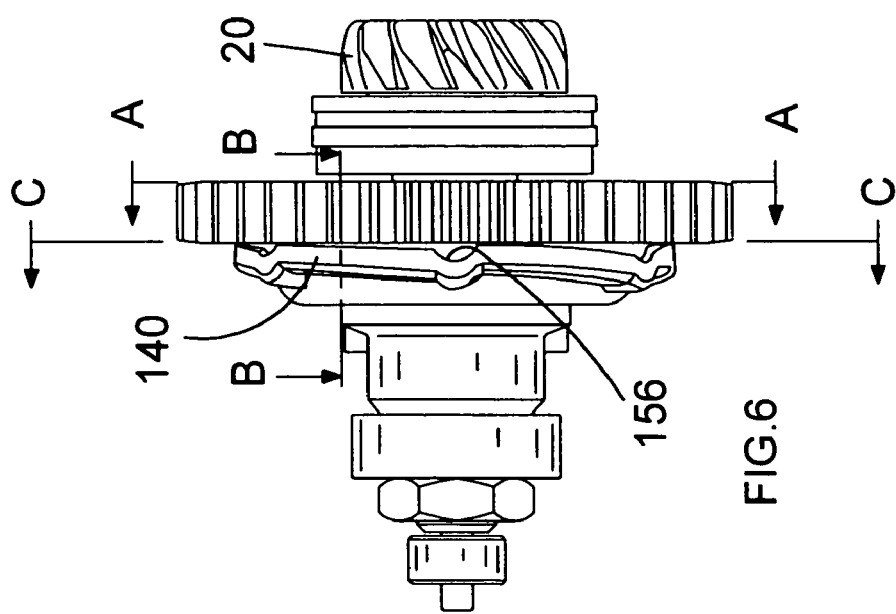

ROTARY TOOL

FIELD OF THE INVENTION

The present invention relates to a two stage clutch, and in particular, to a two stage clutch for a hand held power tool with a rotatingly driven tool or bit, in more particular, to an electrically powered rotary hammering tools.

BACKGROUND OF THE INVENTION

Rotary hammers will normally have a housing and a hollow cylindrical spindle mounted in the housing. The spindle allows insertion of the shank of a tool or bit, for example a drill bit or a chisel bit, into the front end thereof so that it is retained in the front end of the spindle with a degree of axial movement. The spindle may be a single cylindrical part or may be made of two or more co-axial cylindrical parts, which together form the hammer spindle. For example, a front part of the spindle may be formed as a separate tool holder body for retaining the tool or bit.

Such hammers are provided with an impact mechanism which converts the rotational drive from an electric motor to a reciprocating drive for driving a piston, which may be a hollow piston, to reciprocate within the spindle. The piston reciprocatingly drives a ram by means of a closed air cushion located between the piston and the ram. The impacts from the ram are transmitted to the tool or bit of the hammer, optionally via a beat piece.

Rotary hammers can be employed in combination impact and drilling mode, and also in some cases in a drilling only mode, in which the spindle, or a forward most part of the spindle, and hence the bit inserted therein will be caused to rotate. In the combination impact and drilling mode the bit will be caused to rotate at the same time as the bit receives repeated impacts. A rotary drive mechanism transmits rotary drive from the electric motor to the spindle to cause the spindle, or a forward most part thereof to rotate.

It is a problem with hand held power tools with a rotating bit that during use of the tool blocking events can sometimes occur, when the bit becomes stuck in the work piece in such a way that the bit can no longer rotate relative to the work piece. In this case, the rotary drive to the bit causes the housing of the tool to rotate with respect to the stationary bit. It is known to detect blocking events, for example from U.S. Pat. Nos. 5,914,882, 5,584,619, EP0771,619 and GB2,086, 277 and then once such an event is detected, to arrest the rotary drive to the bit. This can be done by braking the motor, which motor provides rotary drive to the bit via a gear arrangement, but this involves an inherent delay due to the time required to arrest the motor. Alternatively or additionally, the rotating spindle can be braked by engaging the spindle with a part of the hammer housing, in some way. The preferred way of cutting off rotary drive to the bit is by the use of a releasable clutch arrangement in the drive train between the motor of the hammer and the spindle.

WO04/024398 describes a hammer drill which utilises a clutch arrangement to protect the hammer drill from such blocking events. Such clutches have torque fresh holds, whereby when a rotary torque is applied to the clutch which reaches a fresh hold, the clutch slips. WO04/024398 discloses a number of designs of clutch which have two torque fresh holds. The clutches can be adjusted between the two settings. This allows the clutches to be adjusted to suite the application for which the hammer is being used.

The present invention aims to provide an improved design of one of the clutches disclosed in WO04/024398.

BRIEF SUMMARY OF THE INVENTION

Accordingly, there is provided an overload clutch assembly for a power tool having a spindle for rotatingly driving a working member of the tool and a motor for rotatingly driving the spindle via the overload clutch assembly;

the overload clutch assembly having a first mode in which rotary drive is transmitted to the spindle when a torque below a first predetermined level (T1) is applied to the clutch, and transmission of rotary drive to the spindle is cut when a torque above the first predetermined level (T1) is applied to the clutch, and at least one second mode in which rotary drive is transmitted to the spindle when a torque below a respective second predetermined level (T2), which is higher than said first predetermined torque (T1), is applied to the clutch assembly, and transmission of rotary drive to the spindle is cut when a torque above the second predetermined level (T2) is applied to the clutch;

the overload clutch assembly capable of being between switched between the first mode and the at least one second mode by at least one actuator;

wherein the clutch assembly comprises a carrier rotationally mounted on an output clutch spindle, one being drivingly connected to the motor, the other being drivingly connected to the spindle;

a first clutch plate non rotationally mounted on the output clutch spindle, the carrier and the first clutch plate being arranged so that the first clutch plate engages with the carrier in such a manner that rotational drive can be transferred between the carrier and the first clutch plate when the torque is below the first predetermined level (T1) but rotational drive is cut between the carrier and the first clutch plate when the torque is above the first predetermined level (T1);

at least one second clutch plate mounted on the output clutch spindle, the second clutch plate being non rotationally connected to the output clutch spindle by the actuator when clutch is in the second mode, the carrier and the second clutch plate being arranged so that, when the second clutch plate is non rotationally connected to the clutch spindle, the second clutch plate engages with the carrier in such a manner that rotational drive can be transferred between the carrier and the second clutch plate when the torque is below the second predetermined level (T2) but rotational drive is cut between the carrier and the second clutch plate when the torque is above the second predetermined level (T2);

characterised in that, when the overload clutch assembly is in the second mode, the torque is transferred from the carrier (16) to the output clutch spindle (100) via the second clutch plate only.

Such a construction results in a clutch capable of being operated at two different torque settings which is easy to replicate with two clearly defined predetermined torque settings.

BRIEF DESCRIPTION OF THE DRAWINGS

A preferred embodiment of the present invention will now be described with reference to the accompanying drawings of which:

FIG. 6 shows a side view of the two stage clutch assembly in accordance with to the present invention;

FIG. 7 shows a horizontal cross section indicated by Arrows A-A in FIG. 6 of the two stage clutch assembly in accordance with to the present invention;

DETAILED DESCRIPTION OF THE INVENTION

Figure 1:
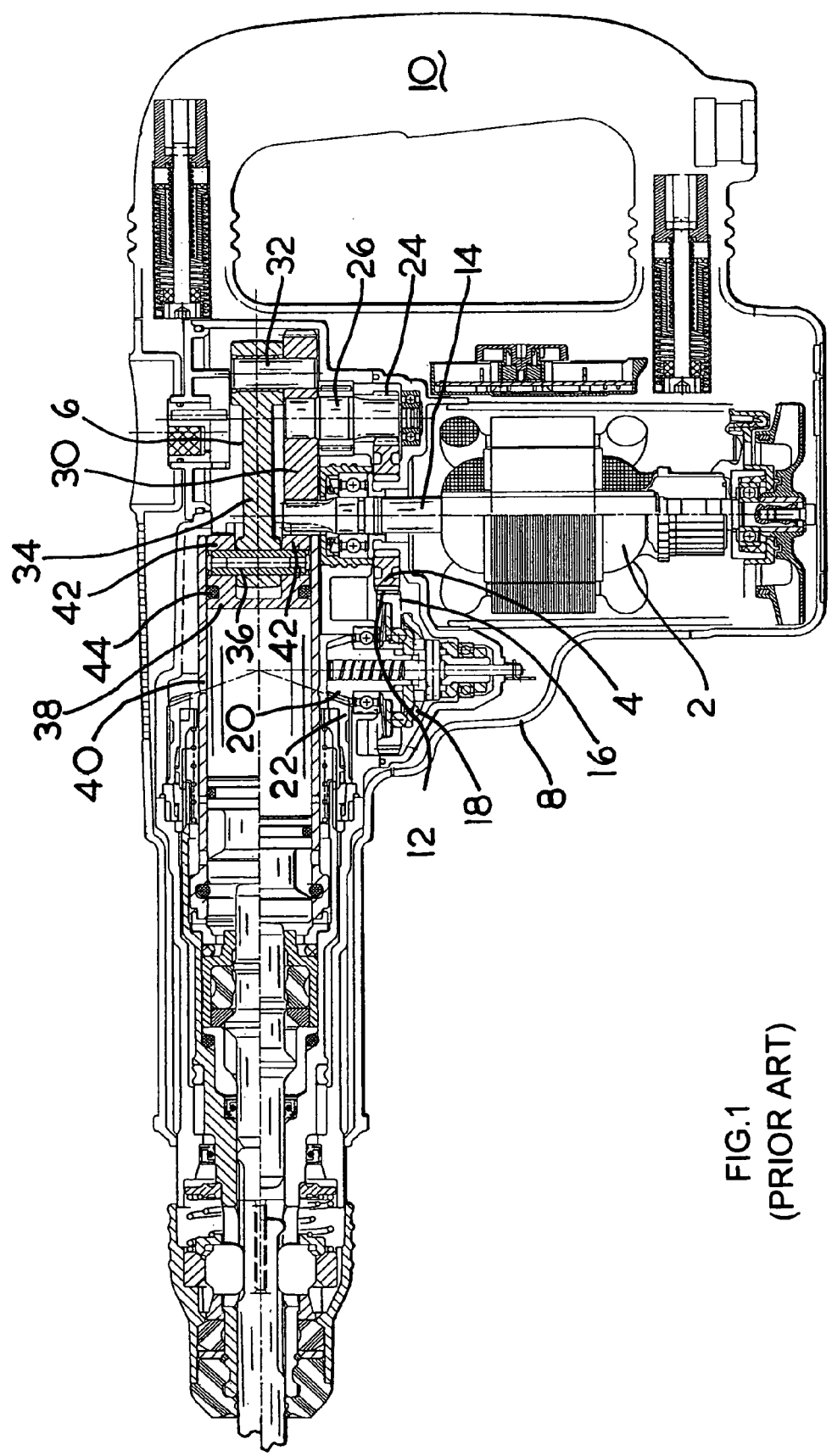
FIG. 1 is a cross sectional side elevation view of a prior art design of hammer.
Figure 2:
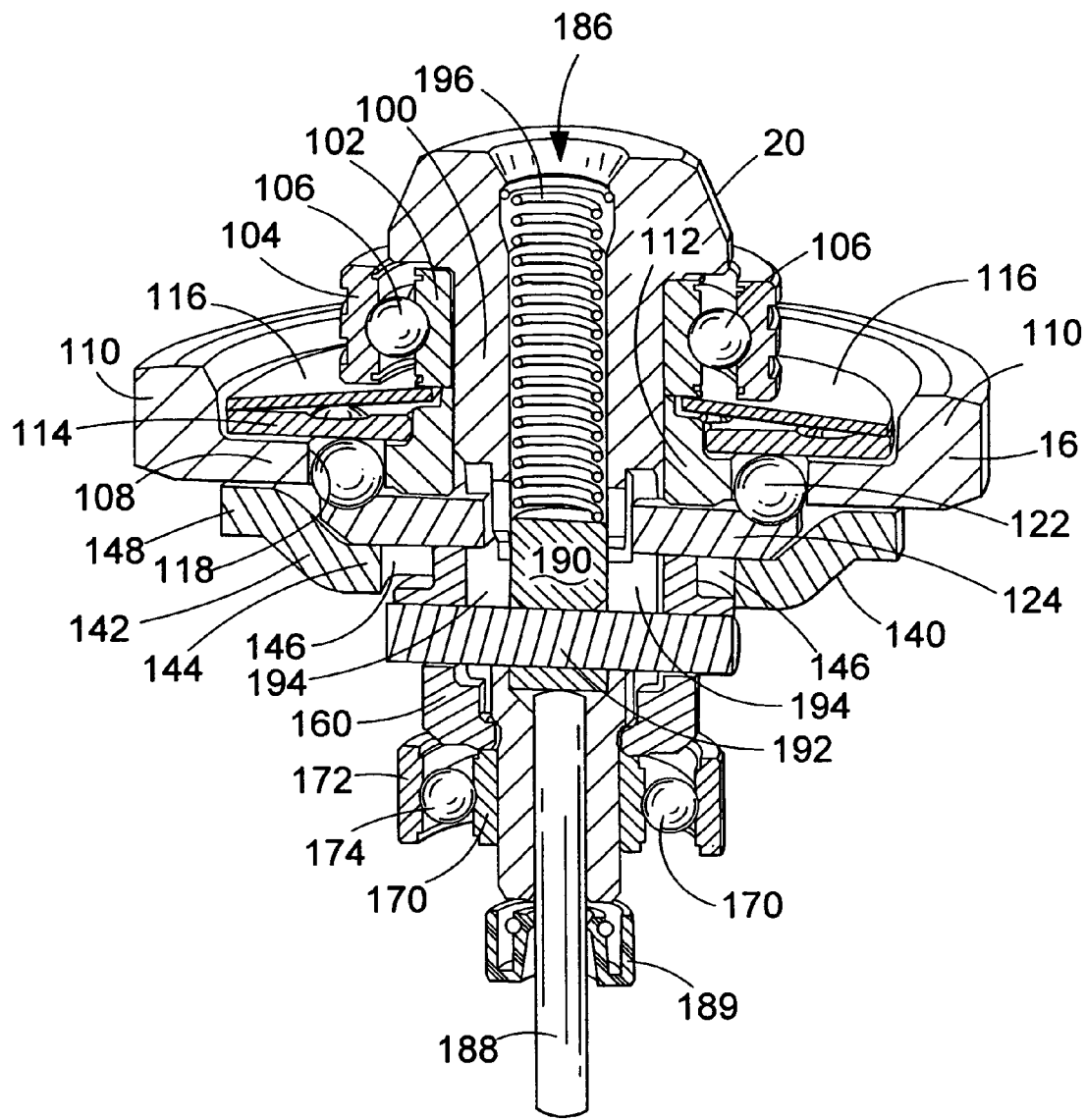
FIG. 2 is a partially cut away perspective view of the overload clutch assembly of FIG. 1.
Figure 3:
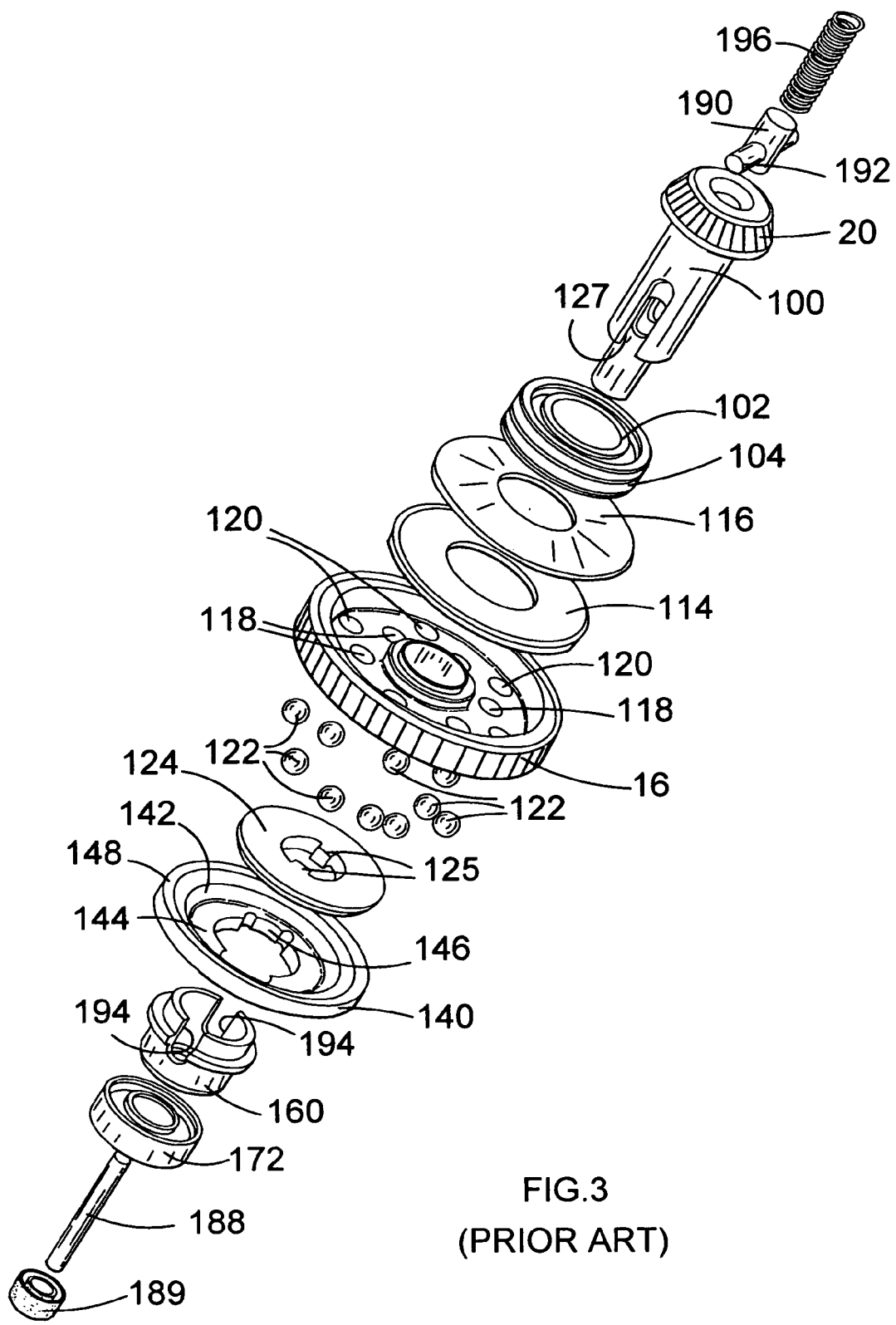
FIG. 3 is an exploded perspective view of the clutch assembly of FIG. 2.

Referring now to FIG. 1, a prior art design of hammer as shown in WO02/024398, comprises an electric motor (2), a spindle drive train (4) and a crank drive arrangement (6) surrounded by a plastic housing (8). A rear handle (10) and a trigger switch arrangement (not shown) are fitted to the rear of the housing (8). An electric cable (not shown) extends through a cable guide and connects the motor (2) to an external electricity supply. Thus, when the cable is connected to the electricity supply and the trigger switch arrangement is depressed, the motor (2) is actuated to rotationally drive the armature of the motor (2).

A main driving gear (12) is press fitted onto a motor pinion (14) and has teeth which engage the teeth of a driving gear (16) of an overload clutch arrangement (18) to rotatingly drive the driving gear (16). The driving gear (16) rotatingly drives a bevel gear (20) of the overload clutch arrangement (18) when the torque transmitted between the two gears (16, 20) is below predetermined thresholds and if no blocking event is detected. The bevel gear (20) meshes with a beveled spindle drive gear (22) which beveled spindle drive gear (22) is rotatably mounted on a cylindrical hollow spindle (40) and can freely rotate about the spindle. The beveled spindle drive gear (22) rotatingly drives the spindle (40) via a rotary drive clutch described below. The overload clutch arrangement (18) is described in more detail below.

The teeth of the driving gear (12) also engage the teeth of a crank drive gear (24) to rotatingly drive the crank drive gear (24). The crank drive gear (24) is non-rotatably mounted on a crank drive spindle (26). A crank plate (30) is non-rotatably mounted at the end of the drive spindle (26) remote from the crank drive gear (24), which crank-plate (30) is formed with an eccentric bore for housing an eccentric crank pin (32). The crank pin (32) extends from the crank plate (30) into a bore at the rearward end of a con-rod or crank arm (34) so that the con-rod (34) can pivot about the crank pin (32). The opposite forward end of the con-rod (34) is formed with a bore through which extends a trunnion pin (36) so that the con-rod (34) can pivot about the trunnion pin. The trunnion pin (36) is fitted to the rear of a piston (38) by fitting the ends of the trunnion pin (36) into receiving bores formed in a pair of opposing arms (42), which arms extend to the rear of the piston (38). The piston (38) is reciprocally mounted in the cylindrical hollow spindle (40) so that it can reciprocate within the hollow spindle. An O-ring seal (44) is fitted in an annular recess formed in the periphery of the piston (38) so as to form an air tight seal between the piston (38) and the internal surface of the hollow spindle (40).

Thus, when the motor (2) is actuated, the armature pinion (14) rotatingly drives the main driving gear (12) and the main driving gear (12) rotatingly drives the crank drive spindle (26) via the crank drive gear (24). The drive spindle (26) rotatingly drives the crank plate (30) and the crank arm arrangement comprising the crank pin (32), the con-rod (34) and the trunnion pin (36) convert the rotational drive from the crank plate (30) to a reciprocating drive to the piston (38). In this way the piston (38) is reciprocatingly driven back and forth along the hollow spindle (40), when the motor (2) is actuated by depression of the trigger switch (not shown) on rear handle (10). The main driving gear (12) also drives the driving gear (16) of the clutch arrangement (18) which drives the bevel gear (20) of the clutch arrangement. The bevel gear (20) of the clutch arrangement rotatingly drives the spindle drive gear (22) and thus the spindle (40) when the spindle drive gear (22) is drivingly connected to the spindle (40). When the mechanism by which the spindle drive gear (22) is connected to the spindle (40) is connected, the hammer operates in a chisel and drill mode, and when it is disconnected, the hammer operates in a chisel mode only.

A two torque clutch of the clutch arrangement (18) of the hammer of FIG. 1 will now be described in more detail with reference to FIGS. 2 to 5.

The bevel gear (20) which forms part of the clutch arrangement (18) is integrally formed with a shaft (100) of circular cross section. The upper end of the shaft (100) is rotatably mounted within the housing (8) of the hammer via a bearing comprising an inner race (102) which is rigidly attached to the shaft (100), an outer race (104) which is rigidly attached to the housing and ball bearings (106) which allows the outer race (102) to freely rotate about the inner race (102). The bearing is located adjacent the underside of the bevel gear (20).

The driving gear (16) is rotatably mounted on the shaft (100) and can freely rotate about the shaft (100). The driving gear (16) abuts the underside of the inner race (102) of the bearing and is prevented from axially sliding away from (downwardly) by the rest of the clutch mechanism which is described in more detail below.

The driving gear (16) is so shaped that it surrounds a toroidal space, the space being surrounded by a flat bottom (108) which projects radially outwards from the shaft (100), an outer side wall (110) upon the outer surface of which are formed the teeth of the driving gear (16) and an inner side wall (112) which is adjacent the shaft (100).

Located within the toroidal space of the driving gear (12) adjacent the flat bottom (108) is a washer (114) which surrounds the inner wall (114) and shaft (100). Mounted on top of the washer (114) is belleville washer (116). The inner edge of the belleville washer is located under the inner race (102) of the bearing whilst the outer edge of the belleville washer abuts against the outer edge of the washer (114) adjacent the outer wall (110) of the driving gear (16). The driving gear (112) is held axially on the longitudinal axis of the shaft (100) in relation to the belleville washer so that the belleville washer (116) is compressed causing it to impart a downward biasing force onto the washer (114) towards the flat bottom (108) of the driving gear (16).

Formed in the flat bottom (108) of the driving gear (16) are two sets of holes; a first inner set (118) of five, each located equidistantly from the longitudinally axis of the shaft in a radial direction and angularly from each other around the longitudinal axis of the shaft (100); a second outer set (120) of five, each located equidistantly from the longitudinal axis of the shaft in a radial direction and angularly from each other around the longitudinal axis of the shaft (100). The radial distance of the outer set (120) from the longitudinal axis of the shaft (100) is greater than that of the inner set (118).

A ball bearing (122) is located in each of the holes and abuts against the underside of the washer (114). The diameters of all the ball bearings (122) are the same, the diameter being greater than the thickness of the flat bottom (108) of the driving gear (16) thereby resulting either the top or bottom of the ball bearings (122) protruding beyond the upper or lower surfaces of the flat bottom (108) of the driving gear (16).

Mounted on the spindle (100) below and adjacent to the driving gear (16) is a first slip washer (124). The first slip washer (124) comprises a circular hole (123) with two splines (125) projecting into the hole (123) which, when the washer is mounted on the spindle (100), locate within two corresponding slots (127) formed in the spindle (100). As such, the first slip washer (124) is none rotatably mounted on the spindle, the spindle (100) rotating when the first slip washer (124) rotates.

Figure 4A:
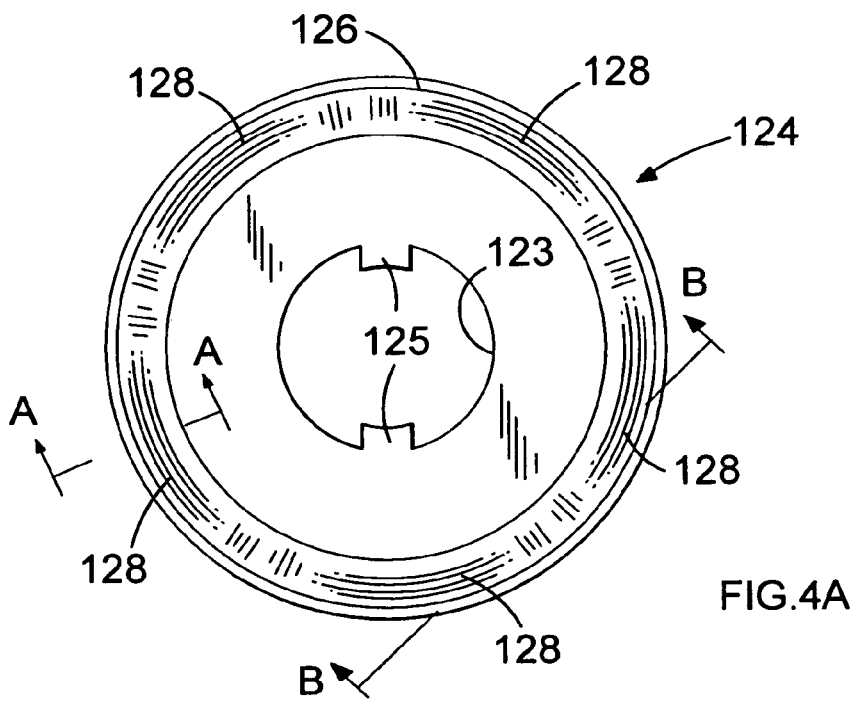
FIGS. 4A to 4C show details of a first driven gear of the clutch assembly of FIGS. 2 and 3.
Figure 4B:
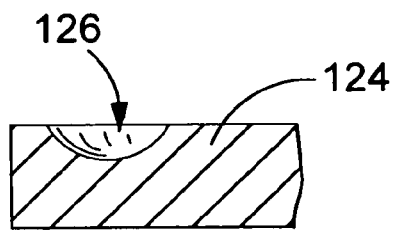
Figure 4C:
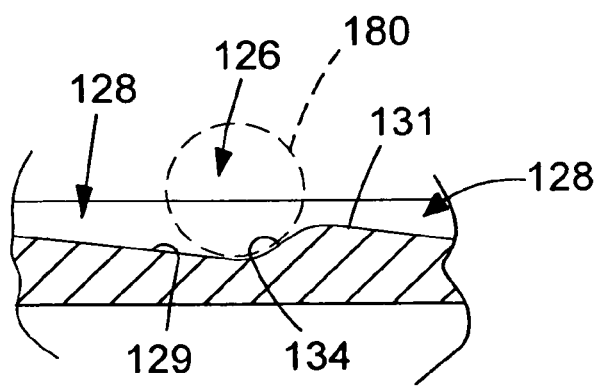

Referring to FIGS. 4A to 4C, formed on one side of the first slip washer (124) around the periphery is a trough (126) with a U shaped cross section (see FIG. 4B). The circular trough (126) is separated into five sections (128), the depth of each section (128) of trough varying from a low point (129) to high point (131). Each section (128) of trough (126) is the same in shape as the other sections (128) of trough (126). The low point (129) of one section (128) of trough is adjacent to the high point (131) of the next section as shown in FIG. 4C. The two are connected via a ramp (134). When the slip washer (124) is mounted on the shaft (100), the side of the first slip washer (124) faces the driving gear (16). The diameter of the first slip washer (124) is less than that of the driving gear (16) and is such that, when the slip washer (124) is mounted on the shaft (100), the trough (126) faces the inner set of holes (118). The five sections (128) which form the trough (126) correspond to the five holes (118) which formed the innermost set of holes in the driving gear (16) so that, when the clutch (18) is assembled, one ball bearing (122) locates in each section (128) and trough (126).

Mounted on the spindle (100) below the first slip washer (124) is a second slip washer (140). The second slip washer (140) is dish shaped having an angled side wall (142) surrounding a flat base (144). When mounted on the spindle, the first slip washer (124) locates within the space surrounded by the side wall (142) and the flat base (144) surface as best seen in FIG. 14. The second slip washer (140) can freely rotate about the spindle (100). A rectangular slot (146) superimposed on a circular hole (147) is formed in the flat base (144) symmetrical about the axis of rotation of the second slip washer (140). Formed on the top of the angled side wall (142) is a flange (148) which projects radially outwards.

Figure 5A:
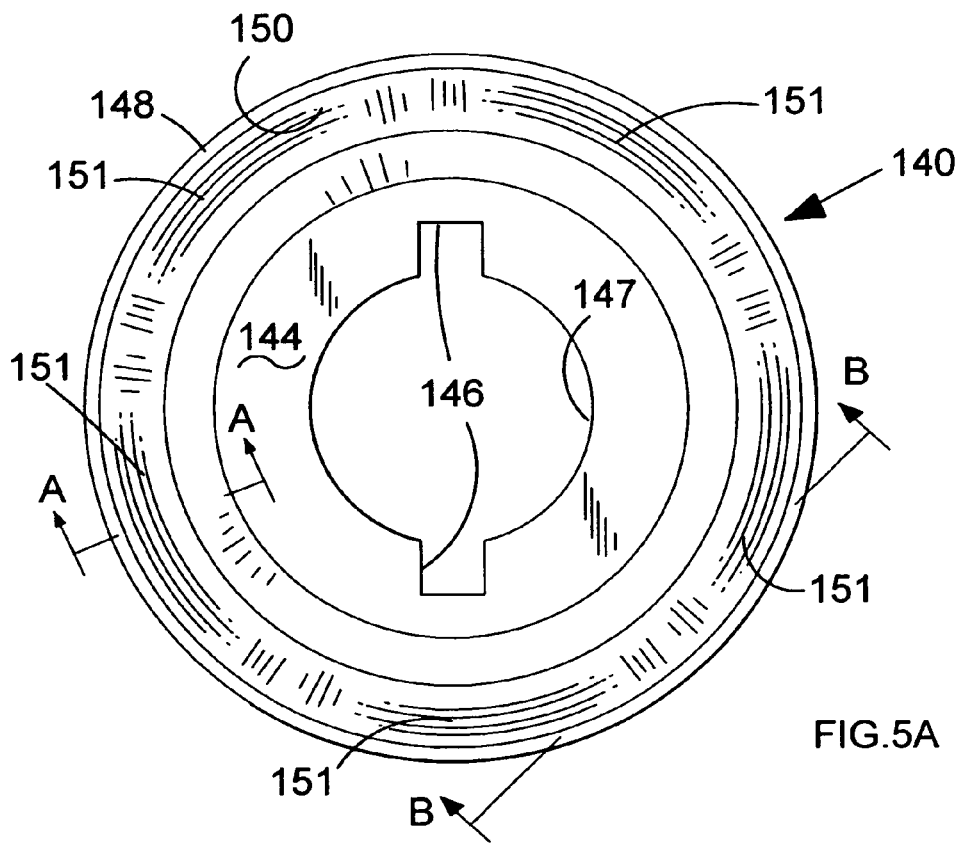
FIGS. 5A to 5C show details of a second driven gear of the clutch assembly of FIGS. 2 and 3.
Figure 5B:
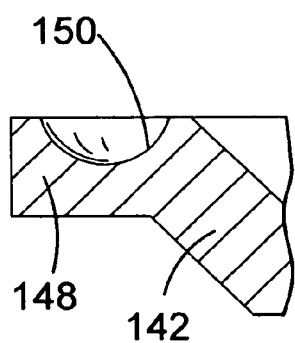
Figure 5C:
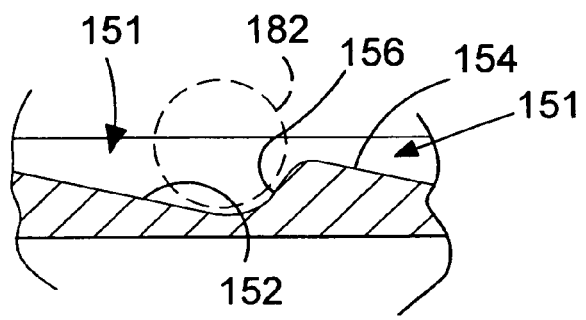
Figure 9:
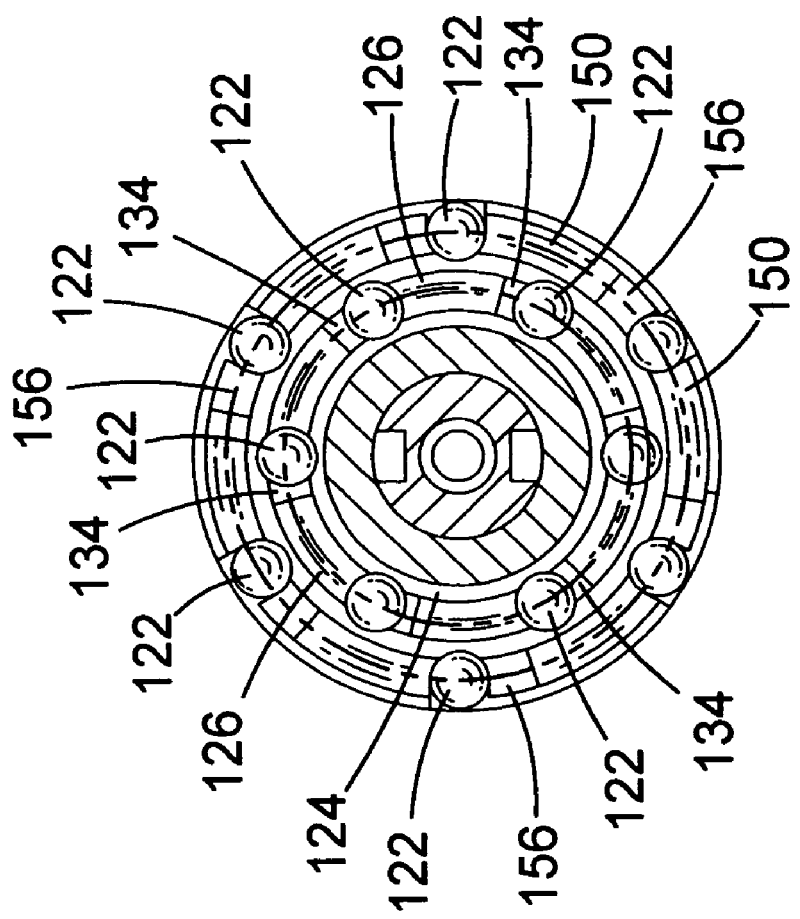
FIG. 9 shows a horizontal cross section indicated by Arrows C-C in FIG. 6 of the two stage clutch assembly in accordance with to the present invention.
Figure 8:
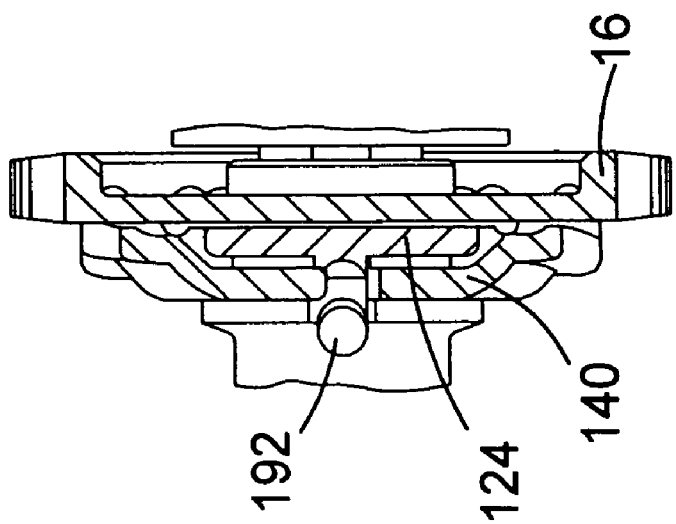
FIG. 8 shows a vertical cross section indicated by Arrows B-B in FIG. 6 of the two stage clutch assembly in accordance with to the present invention.

Referring to FIG. 5, formed on the top side of the radial flange (148), around the radial flange (148), is a trough (150) with a U shaped cross section which is similar in shape to that on the first slip washer (124). The circular trough (150) is separated into five sections (151), the depth of each section of trough varying from a low point (152) to a high point (154). Each section (151) of the trough (150) is the same in shape as the other sections of trough. The low point (152) of one section of trough is adjacent to the high point (154) of the next section. The two are connected via a ramp (156). When the second slip washer (140) is mounted on the shaft as shown, the side of the flange (148) with the trough (150) faces the driving gear (16). The diameter of the flange (150) is such that, when the second slip washer (140) is mounted on the shaft (100), the trough (150) faces the outer set of holes (120) in the driving gear (16). The five sections (151) which form the trough (150) correspond to the five holes (120) which form the outermost set of holes in the driving gear (16) so that, when the clutch is assembled, one ball bearing (122) locates in each section of the trough (150).

The size of the ramps (134) in the trough (126) of the first slip ring (124) is less than that of the size of the ramps (156) formed in the trough (150) of the second slip washer (140), the variation of the height of each section of trough in the first slip washer (124) from the low end (120) to the high end (131) being less than that of the variation of the height of each section of trough in the second slip washer from the low end (152) to the high end (154).

When the clutch is assembled, the ball bearings (122) in the innermost set of holes (118) in the driving gear (16) locate within the trough (126) of the first slip washer (124) (one ball bearing per section) and the ball bearings (122) in the outer most set of holes (120) in the driving gear (16) locate within the trough (150) of the second slip washer (140) (one ball bearing per section).

A circular clip (160) is rigidly mounted on the spindle (100) below the second slip washer (140) which holds the first and second slip washers (124, 140) together with the driving gear (16) against the underside of the bearing in a sandwich construction preventing axial displacement of the three along the spindle. Rotation of the circular clip results in rotation of the spindle (100).

The lower end of shaft (100) is rotatably mounted within the housing (8) of the hammer via a second bearing comprising an inner race (170) which is rigidly attached to the shaft (100), an outer race (172) which is rigidly attached to the housing (8) and ball bearings (174) which allows the outer race (174) to freely rotate about the inner race (170). The bearing is located adjacent the underside of the circular clip (160).

When the clutch is fully assembled and no rotary torque is being transferred through it, each of the ball bearings in the innermost holes (118) of the driving gear (16) locate in the lowest points (134) of the corresponding sections (128) of the trough in the first slip washer (124) as indicated by the dashed line (180). When the ball bearings (122) are located within the lowest points (129) of the sections (128) of the trough (126), the tops of the ball bearings (122), which are adjacent to the washer (114), are flush with the surface facing the washer (114) of the flat bottom (108) of the driving gear (16). The ball bearings (122) locate in the lowest points (129) due to the biasing force of the belleville washer (116) which is biasing the washer (114) in a downward direction which in turn pushed the ball bearings (122) to their lowest positions.

Similarly, when the clutch is fully assembled and no rotary torque is being transferred through it, each of the ball bearings (122) in the outermost holes (120) of the driving gear (16) locate in the lowest points (152) of the corresponding sections (151) of the trough (150) in the second slip washer (140) as indicated by the dashed line (182). When the ball bearings (122) are located within the lowest point (152) of the sections (151) of the trough (150), the tops of the ball bearings (122), which are adjacent to the washer (114), are flush with the surface of the flat bottom (108) of the driving gear (16) facing the washer (114). The ball bearings (122) locate in the lowest points (156) due to the biasing force of the belleville washer (114) which is biasing the washer (114) in a downward direction which in turn pushes the ball bearings (122) to their lowest positions.

Formed through the length of the spindle (100) is a tubular passageway (186). Located within the lower section of the tubular passageway (186) is a rod (188). The rod projects below the spindle (100) beyond the spindle (100). A seal (189) is attached to the base of the spindle (100) and surrounds the rod (188). The seal (189) prevents the ingress of dirt.

Rigidly attached to the upper end of the rod (188) a sleeve (190). Projecting in opposite directions perpendicularly to the sleeve (190) are two pegs (192). The sleeve (190) located within the spindle (100) in a position along the length of the spindle (100) where the sleeve (190) and pegs (192) are surrounded by the circular clip (160). Two vertical slots (194) are formed in the sides of the circular clip (160). The top end of the slots (194) extends to the top of the circular clip (160). The bottoms of the slots (194) extends part way down the circular clip (160), terminating in a base. In each of the slots (194) is located one of the pegs (192). The pegs (192) extend through the slots (194, 127) on the spindle (100) and the circular clip (160). The rod (188), together with the sleeve (140) and two pegs (192) can vertically slide up and down. The lowest position is where the two pegs (192) abut the bottom of the slots (194) of the circular clip (160), further downward movement being prevented by the base of the slots (194) in the circular clip as shown in FIG. 14. The highest position is where the two pegs (192) locate within the rectangular slot (146) within the second slip washer (140) in addition to being located within the top end of the slot (160), further upward movement being prevented by the underside of the first slip washer (124). A spring (196) locates between the top of the spindle (100) and the sleeve (190) in the upper section of the tubular passageway (186). The spring biases (196) the sleeve (190), two pegs (192) and rod (188) towards their lowest position. Regardless of whether the pegs (192) are at their upper or lower position, rotation of the pegs (192), results in rotation of the circular clip (160) due to the pegs (192) being located in the slots (194) which in turn results in rotation of the spindle (100).

Movement of the rod (188) between its lowest and highest position changes the clutch (18) from a low torque to a high torque clutch. The mechanism by which the rod is moved vertically is described below. The clutch operates by transferring the rotary movement from the driving gear (16) to the bevel gear (20) which is integral with the spindle (100). When the torque across the clutch (18) is below a predetermined value the driving gear (16) will rotatingly drive the bevel gear (20). When the torque across the clutch is above a predetermined value, the driving gear (16) will rotate but the bevel gear (20) will remain stationary, the clutch (18) slipping as the driving gear (16) rotates. The predetermined value of the torque at which the clutch (18) slips can be alternated between two preset values by the sliding movement of the rod (188) between the lowest and highest positions.

The mechanism by which the clutch (18) works will now be described.

Low Torque Operation

The rod (188) is located in its lowest position when the clutch (18) is acting as a low torque clutch. When in this position, the pegs (192) are disengaged from the rectangular aperture (146) in the second slip washer (140). As such, therefore, the second slip washer (140) can freely rotate about the spindle (100). As such no rotary movement can be transferred between the second slip washer (140) and the spindle (100). Therefore, all rotary movement between the driving gear (16) and the bevel gear (20) is transferred via the first slip washer (124) only.

The electric motor (2) rotatingly drives the driving gear (16) via the main driving gear (12). The driving gear (16) can freely rotate about the spindle (100). As such, no rotary movement can be transferred to the spindle (100) directly from the driving gear (16). As the driving gear rotates, the ball bearings (122) located within the innermost set of holes (118) formed within the driving gear (16) also rotate with the driving gear (16). Under normal circumstances when the rotary movement is being transferred, the ball bearings (122) are held in the lowest point (129) of the section (128) of the trough (126) formed in the first slip washer (124) by the washer (114) which is biased downwardly by the biasing force of the belleville washer (116). The direction of rotation is such that the ball bearings (122) are pushed against the ramps (134) of the trough (126), the ball bearings (122) being prevented from riding up the ramps (134) by the biasing force of the belleville washer (116). As such, when the ball bearings in the innermost set (118) rotate, the ramps (134) and hence the first slip washer (124) also rotate. As the first slip washer (124) is non-rotatably mounted on the spindle (100) due to the splines (125) engaging the slot (127) in the spindle (100), as the first slip washer (126) rotates, so does the spindle (100) and hence the bevel gear (20). As such the rotary movement is transferred from the driving gear (16) to the bevel gear (22) via the ball bearings (122) in the innermost set of holes (118), the ramps (134) and the first slip washer (124).

However, when a torque is applied to the clutch (18) (in the form of a resistance to the turning movement of the bevel gear (22)) above a certain amount, the amount of the force required to be transferred to from the ball bearings (122) to the ramps (134) on the first slip washer (124) is greater than the force exerted by the belleville (116) on the ball bearings (122) keeping them in the lowest point (129) of the section (128) of the trough (126). Therefore, the ball bearings (122) ride over the ramps (134) and then continue down the slope of the next section (128) until it engages the next ramp (134). If the torque is still greater than the predetermined amount the process is repeated, the ball bearing (122) riding up the ramps (134) against the biasing force of the belleville washer (116) and then rolling across the next section. As this happens the first slip washer (124) remains stationary and hence the spindle (100) and bevel gear (22) also remain stationary. Therefore, the rotary movement of the driving gear (16) is not transferred to the bevel gear (22).

Though the second slip washer (140) plays no part in transferring the rotary movement of the driving gear (16) to the spindle (100) in the low torque setting, it is nevertheless rotated by the driving gear (16).

High Torque Operation

The rod (188) is located in its highest position when the clutch (18) is acting as a high torque clutch. When in this position, the pegs (192) are engaged with the rectangular aperture (146) in the second slip washer (124). As such, the second slip washer (124) is rotatably fixed to the spindle (100) via the pegs (192) located in the rectangular slot (146), the slots (194, 127) of the circular clip (160) and spindle (100). As such rotary movement can be transferred between the second slip washer (140) and the spindle (100). Therefore, rotary movement between the driving gear (16) and the bevel gear (22) can be transferred via the first slip washer (124) and/or the second slip washer (140) when the torque is below the lower torque fresh hold set by the first slip washer.

The mechanism by which the driving gear (16) transfers its rotary motion to the first slip washer (124) via the ball bearings (122) and ramps (134) is the same as that for the second slip washer (140).

The electric motor (2) rotatingly drives the driving gear (16) via the main driving gear (12). The driving gear (16) can freely rotate about the spindle (100). As such, no rotary movement can be transferred to the spindle (100) directly from the driving gear (16). As the driving gear (16) rotates, the ball bearings (122) located within the innermost (118) and outermost (120) set of holes formed within the driving gear (16) also rotate with the driving gear (16). Under normal circumstances when the rotary movement is being transferred, the ball bearings (122) are held in the lowest point (129, 152) of the sections (128, 151) of the troughs (126, 150) formed in both the first slip washer (126) and the second slip washer (140) by the washer (114) which is biased downwardly by the biasing force of the belleville washer (116). The direction of rotation is such that the ball bearings (122) are pushed against the ramps (134, 156) of the troughs (126, 150) of both the first slip washer (124) and the second slip washer (140), the ball bearings (122) being prevented from riding up the ramps (134, 156) by the biasing force of the belleville washer (116). As such, when the ball bearings (122) rotate, the ramps (134, 156) and hence the first and second slip washers (124, 140) also rotate. As both the first and second slip washers (124, 140) are non-rotatably mounted on the spindle (100), as the first and second slip washers rotate (124, 140), so does the spindle (100) and hence the bevel gear (22). As such the rotary movement is transferred from the driving gear (16) to the bevel gear (22) via the ball bearings (122) in the inner and outermost set of holes (118, 120), the ramps (134, 156) and the first and second slip washers (124, 140).

However, when a torque is applied to the clutch (18) (in the form of a resistance to the turn movement of the bevel gear (22)) above a certain amount, the amount of the force required to be transferred to from the ball bearings (122) to the ramps (134, 156) is greater than the force exerted by the belleville washer (116) on the ball bearings (122) keeping it in the lowest points (129, 152) of the sections of the troughs. The amount of torque required in the high torque setting is higher than that in the low torque setting. This is due to the size of the ramps (156) between sections (151) of the trough (150) in the second slip washer (140) being greater than the size of the ramps (134) between sections (128) of the trough (126) in the first slip washer (124) requiring the belleville washer (116) to be compressed to a greater extent and hence requires force for it to be done so. Therefore, when the force exceeds this greater value, the ball bearings (122) ride over the ramps (134, 156) and then continue down the slope of the next section until they engage the next ramp (134, 156). If the torque is still greater than the predetermined value the process is repeated, the ball bearings (122) riding up the ramps (134, 156) against the biasing force of the belleville washer (116) and then rolling across the next section. As this happens the first and second slip washers (124, 140) remain stationary and hence the spindle (100) and bevel gear (22) also remain stationary. Therefore, the rotary movement of the driving gear (16) is not transferred to the bevel gear (22).

Torque Change Mechanism

An example of the mechanism by which the torque setting of the clutch (18) is can be adjusted by the internal mechanism of the hammer is described in WO04/024398 and as such no further references will be made to this within this specification.

EMBODIMENT OF THE INVENTION

An embodiment of the present invention will now be described with reference to FIGS. 6 to 12. The two stage clutch according to the invention is similar to the prior art design described previously with reference to FIGS. 1 to 5. Where the same features are present in the embodiment of the invention which are present in the prior art design, the same reference numbers have been used.

In the prior art design (see above), when the two stage clutch is in the low torque setting, no rotary movement can be transferred between the second slip washer (140) and the spindle (100). Therefore, all rotary movement between the driving gear (16) and the bevel gear (20) is transferred via the first slip washer (124) only.

Figure 12:
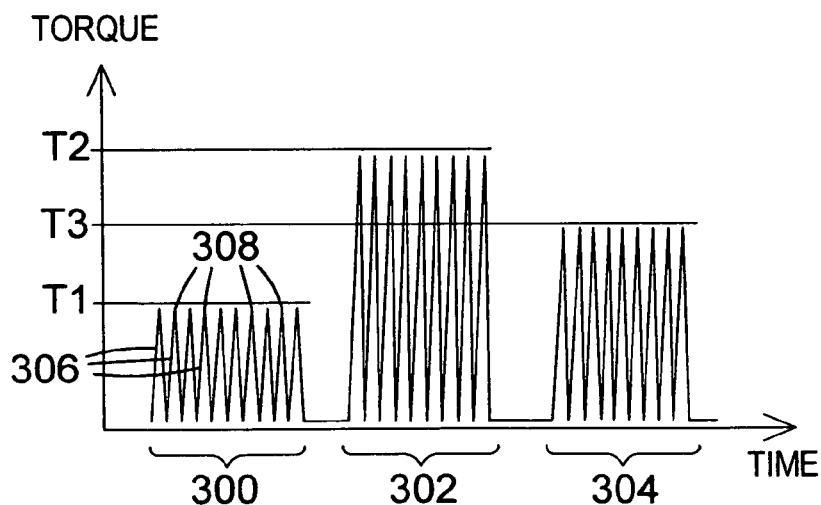
FIG. 12 shows a graph of toque versus time for 1) the problematic alignment when the clutch assembly slips and 2) the alignment according to the present invention when the clutch assembly slips.

The present embodiment of the invention operates in the same manner when it is in the low torque setting. Section (300) of FIG. 12 shows a graph of the torque across the two stage clutch (18) versus time when the clutch is in its low torque setting and a sufficient torque is being applied to clutch (18) to cause it to repeatedly slip.

When the clutch is in its low torque setting, the clutch (18) slips when a torque of T1 is applied across the clutch (18).

When the clutch (18) is in the low torque setting, only the first slip washer (124) transfers torque via the ball bearings (122) located within the trough (126) of the first slip washer (124). When the ball bearings (122) are located within the trough (126) they are capable of rolling along the sections (128) of the trough (126) until they engage with the ramps (134) where they stop until a sufficient torque is applied to cause them to ride over the ramps (134). Therefore the torque is transferred to the first slip washer (124) when the ball bearings (122) are in the lowest positions (129) in the trough (126).

An increasing torque is applied to the clutch (18) until the limit of T1 is reached. At this point, the ball bearings (122) ride over the ramps (134) into the next sections (128) and then roll along the trough (126) until they meet the next lowest position (129). Whilst the ball bearings (122) are rolling along the sections (128) of the trough (126), the torque across the clutch (18) drops as there is rotational movement between the first slip washer (124) and the driving gear (16). The ball bearings (122) then stop until the torque applied across the clutch (18) reaches T1 again, and the ball bearings (122) pass over the next ramp (134). The process repeats until the torque is reduced below T1 and the ball bearings (122) remain stationary in the lowest points (129) of the trough (126). The slippage results in the shape of the graph (300) which consists of a plurality of spikes (306), the peak (308) indicating where the torque T1 has been reached and the ball bearings (122) roll over the ramps (134), the drop in between the peaks (308) indicating when the ball bearings (122) are rolling within the troughs (126).

As with the prior art design (see above), when the two stage clutch (18) is in the high torque setting, both the first slip washer (124) and the second slip washer (140) are rotatably fixed relative to the spindle.

The present invention relates to an improvement to the clutch (18) when it is the high torque setting.

As with the prior design of two stage clutch (18), the electric motor (2) rotatingly drives the driving gear (16) via the main driving gear (12). The driving gear (16) can freely rotate about the spindle (100). As such, no rotary movement can be transferred to the spindle (100) directly from the driving gear (16). As the driving gear (16) rotates, the ball bearings (122) located within the innermost (118) and outermost (120) set of holes formed within the driving gear (16) also rotate with the driving gear (16). Under normal circumstances when the rotary movement is being transferred, the ball bearings (122) are held in the lowest point (129, 152) of the sections (128, 151) of the troughs (126, 150) formed in both the first slip washer (124) and the second slip washer (140) by the washer (114) which is biased downwardly by the biasing force of the belleville washer (116).

However, in the two stage clutch (18) in accordance with the present invention, the position of the ramps (134) in the first slip washer (124) are located in the assembled clutch (18) relative to the ramps (156) in the second slip washer (140) in such a manner that when a rotational driving torque is applied across the clutch (18), the torque is transferred via the second slip washer (140) only. This is achieved by ensuring that the ball bearings (122) in the trough (150) of the second slip washer (140) drivingly engage with the ramps (156) of the trough (150) in the second slip washer (140) prior to the ball bearings !22) in the trough (126) of the first washer (124) being able to drivingly engage with the ramps (134) in the trough (126) of the first slip washer (124). This ensures that in the high torque setting, only the second slip washer (140) transfers the toque from the driving gear (16) to the spindle (100), the first slip washer (124) playing no part in the transfer of the rotational drive to the spindle from the driving gear (16).

Figure 11:
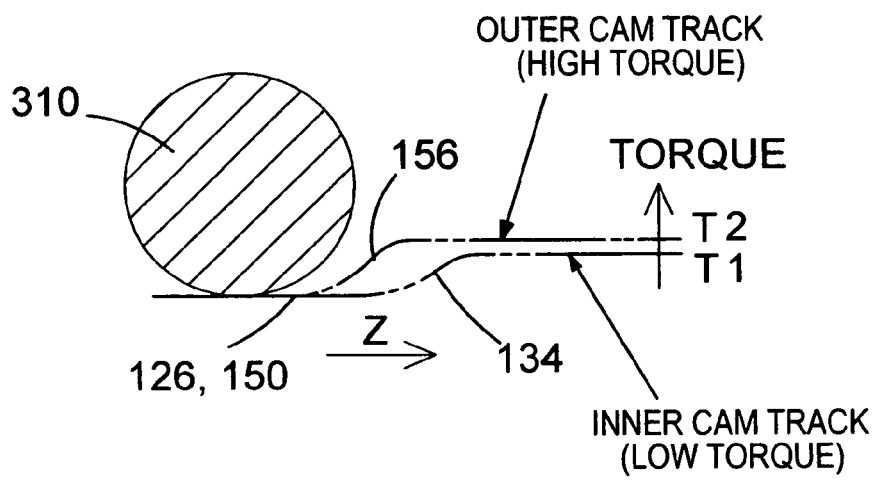
FIG. 11 shows the alignment in accordance with the present invention of the ramps in the inner and outer troughs of the two stage clutch assembly.

FIG. 11 shows a graphic representation of the alignment of the ramps (134; 156) formed in each of the troughs 126; 150) in the first and second slip washers (124; 140). FIG. 11 shows a ball bearing (310) which represents the position of a ball bearing I(122) n the trough (126) of the first slip washer (124) and also a corresponding ball bearing (122) in the trough (150) of the second slip washer (140). The position of the an inner ball bearing and an outer ball bearing are shown as being the same. The relative positions of the ramps (134; 156) in the troughs (134; 150) in the first and second slip washers (124; 140) are represented by the dashed lines as shown. As can be seen, the ramps (156) in the second slip washer (140) is ahead (further to the left in FIG. 11) of the ramps (134) in the trough (126) of the first slip washer (124). As the ball bearings (122) rolls along the troughs (126; 150) in direction of Arrow Z in FIG. 11, it can be seen that the ball bearing (310) will engage with the ramp (156) in the trough (150) of the second slip washer (140) prior to ball bearing (310) in first slip washer (124) engaging with ramp (134) in the trough (126) of the first slip washer (124). Thus, all the torque is transferred through second slip washer (140).

Section (302) of FIG. 12 shows a graph of the torque across the two stage clutch (18) versus time when the clutch (18) is in its high torque setting and a sufficient torque is being applied to clutch (18) to cause it to repeatedly slip. The clutch (18) slips at when a torque of T2 is reached as shown. The value of T2 is dependent on the amount of torque require to make the second slip washer (140) slip only.

By ensuring that only the second slip washer (140) transfers the toque from the driving gear (16) to the spindle (100) by constructing the clutch (18) so that the ball bearings (122) in the trough (150) of the second slip washer (140) engage with the ramps (156) in the trough (150) of the second slip washer (140) prior to ball bearings (122) in first slip washer (124) engaging with ramps (134) in the trough (126) of the first slip washer (124), it provides torque setting of a consistent value (T2) at which the clutch (18) slips when it is in a high torque.

Figure 10:
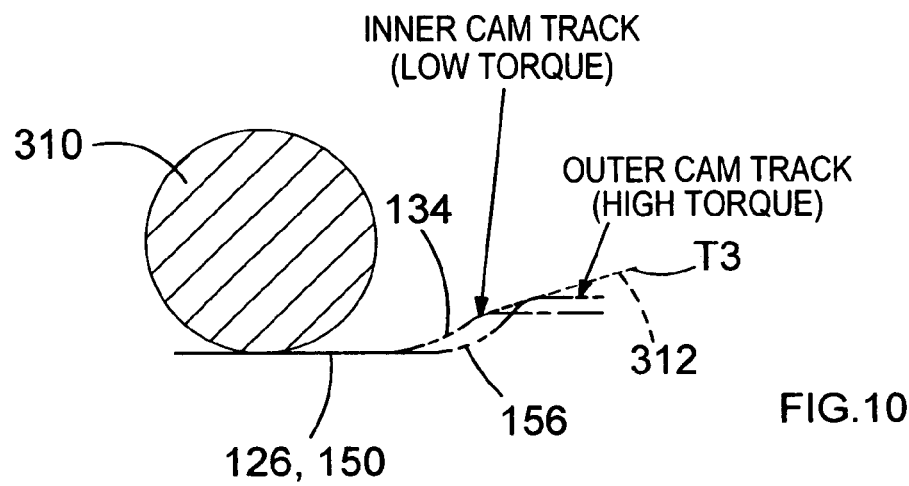
FIG. 10 shows a problematic alignment of the ramps in the inner and outer troughs of the two stage clutch assembly.

FIG. 10 demonstrates the problem if that the ball bearings (122) in the trough (150) of the second slip washer (140) engage with the ramps (156) in the trough (150) of the second slip washer (140) after ball bearings (122) in first slip washer (124) engage with the ramps (134) in the trough (126) of the first slip washer (124). In such a construction, the ball bearings (122) first engage with ramps (134) in the first slip washer (124). This results in a combined ramp characteristic (312) for the ball bearings (122) in both troughs (126; 150) which alter the torque slippage characteristics of the clutch (18) in the high torque setting. This results in the clutch (18) slipping at an intermediate torque of T3 (see section (304) of FIG. 12), the value of which is hard to determine and manufacture in a consistent manner.

The construction of the two stage clutch (18) in accordance with the present invention is further improved over the prior art design by the inner most set of holes (118) each having a chamfer (314) to ease the movement of the ball bearings (122) located within them. It will be appreciated that the outer most set of holes (120) could also each have a chamfer to ease the movement of the ball bearings (122) located within them.

The invention claimed is:

1. An overload clutch assembly for a power tool having a spindle for rotatingly driving a working member of the tool and a motor for rotatingly driving the spindle via the overload clutch assembly;

the overload clutch assembly having a first mode in which rotary drive is transmitted to the spindle when a torque below a first predetermined level is applied to the clutch, and transmission of rotary drive to the spindle is cut when a torque above the first predetermined level is applied to the clutch, and a second mode in which rotary drive is transmitted to the spindle when a torque below a second predetermined level, which is higher than the first predetermined torque, is applied to the clutch assembly, and transmission of rotary drive to the spindle is cut when a torque above the second predetermined level is applied to the clutch;

the overload clutch assembly capable of being between switched between the first mode and the second mode by an actuator;

wherein the clutch assembly comprises a carrier rotationally mounted on an output clutch spindle, one of the carrier and the output clutch spindle being drivingly connected to the motor, the other of the carrier and the output clutch spindle being drivingly connected to the spindle;

a first clutch plate non rotationally mounted on the output clutch spindle, the carrier and the first clutch plate arranged so that the first clutch plate engages with the carrier for the transfer of rotational drive between the carrier and the first clutch plate when the torque is below the first predetermined level, but rotational drive is cut between the carrier and the first clutch plate when the torque is above the first predetermined level;

a second clutch plate mounted on the output clutch spindle, the second clutch plate non rotationally connectable to the output clutch spindle by the actuator when the clutch is in the second mode, the carrier and the second clutch plate arranged so that, when the second clutch plate is non rotationally connected to the clutch spindle, the second clutch plate engages with the carrier to transfer rotational drive between the carrier and the second clutch plate when the torque is below the second predetermined level, but rotational drive is cut between the carrier and the second clutch plate when the torque is above the second predetermined level; and when the overload clutch assembly is in the second mode, the torque is transferred from the carrier to the output clutch spindle via the second clutch plate only.

2. An overload clutch assembly as claimed in claim 1 and further comprising a first set of locking elements and a second set of locking elements supported on the carrier and wherein:

when the clutch assembly is in the first mode, the first clutch plate is engaged with the carrier via the first set of locking elements, and the first set of locking elements transfer torque between the carrier and the output clutch spindle when the torque is below the first predetermined level; and when the clutch assembly is in the second mode, the second clutch plate is engaged with the carrier via the second set of locking elements, and the second set of locking elements transfer torque between the carrier and the output clutch spindle when the torque is below the second predetermined level.

3. An overload clutch assembly as claimed in claim 2 wherein, when the clutch assembly is in the first mode, the first set of locking elements allow the carrier to become rotationally disconnected from the output clutch spindle, when the torque is above the first predetermined level.

4. An overload clutch assembly as claimed in claim 2 wherein, when the clutch assembly is in the second mode, the second set of locking elements allow the carrier to become rotationally disconnected from the output clutch spindle, when the torque is above the second predetermined level.

5. An overload clutch assembly as claimed in claim 2 and wherein the carrier includes recesses, and the first set of locking elements and the second set of locking elements are supported in the recesses.

6. An overload clutch assembly as claimed in claim 5 wherein a plurality of the recesses are chamfered.

7. An overload clutch assembly as claimed in claim 2 wherein one of the first set of locking elements and the second set of locking elements is ball bearings.

8. An overload clutch assembly as claimed in claim 1 wherein both the first clutch plate and the second clutch plates are co-axial with and face towards the carrier.

9. An overload clutch assembly as claimed in claim 8 wherein the first clutch plate includes a first trough which faces the carrier, and the first set of locking elements can travel along the trough when the first clutch plate rotates in relation to the carrier, and the first trough includes a first ramp, and the first set of locking elements pass over the first ramp when a torque greater than the first predetermined torque is placed across the clutch assembly, but when a torque less than the first predetermined torque is placed across the clutch assembly, then the first set of locking elements do not pass over the first ramp.

10. An overload clutch assembly as claimed in claim 9 wherein the second clutch plate includes a trough which faces the carrier, and the second set of locking elements can travel along the trough when the second clutch plate rotates in relation to the carrier, and the second trough includes a second ramp, and the second set of locking elements pass over the second ramp when a torque greater than the second predetermined torque is placed across the clutch assembly, but when a torque less than the second predetermined torque is placed across the clutch assembly, then the second set of locking elements do not pass over the second ramp.

11. An overload clutch assembly as claimed in claim 10 wherein, the first ramp is arranged in the first trough and the second ramp is arranged in the second trough so that, when the when the second clutch plate is non rotationally connected to the clutch spindle, the second set of locking elements in the second trough engage with the second ramp before the first set of locking elements in the first trough engage with the first ramp, in order to transfer the torque between the carrier and the output clutch spindle via the second clutch plate.

12. A drill for rotatably driving a working tool, the drill comprising:

a motor;

a spindle rotatably driveable by the motor;

an overload clutch assembly located between the motor and the spindle for transmitting and interrupting rotary drive torque between the motor and the spindle, the overload clutch assembly having a first mode in which rotary drive is transmitted to the spindle when a torque below a first predetermined level is applied to the clutch assembly, and transmission of rotary drive to the spindle is interrupted when a torque above the first predetermined level is applied to the clutch assembly, and a second mode in which rotary drive is transmitted to the spindle when a torque below a second predetermined level is applied to the clutch assembly, and transmission of rotary drive to the spindle is interrupted when a torque above the second predetermined level is applied to the clutch assembly, and the second predetermined level is higher than the first predetermined level; and the overload clutch assembly is switchable between the first mode and the second mode by an actuator; and wherein the clutch assembly comprises:

a carrier rotationally mounted on an output clutch spindle, one of the carrier and the output clutch spindle being drivingly connected to the motor, the other of the carrier and the output clutch spindle being drivingly connected to the spindle;

a first clutch plate non rotationally mounted on the output clutch spindle, the carrier and the first clutch plate arranged so that the first clutch plate engages with the carrier for the transfer of rotational drive between the carrier and the first clutch plate when the torque is below the first predetermined level, but rotational drive is cut between the carrier and the first clutch plate when the torque is above the first predetermined level;

a second clutch plate mounted on the output clutch spindle, the second clutch plate non rotationally connectable to the output clutch spindle by the actuator when the clutch is in the second mode, the carrier and the second clutch plate arranged so that, when the second clutch plate is non rotationally connected to the clutch spindle, the second clutch plate engages with the carrier to transfer rotational drive between the carrier and the second clutch plate when the torque is below the second predetermined level, but rotational drive is cut between the carrier and the second clutch plate when the torque is above the second predetermined level; and when the overload clutch assembly is in the second mode, the torque is transferred from the carrier to the output clutch spindle via the second clutch plate only.

13. A clutch assembly for a rotary power tool, the clutch assembly comprising:

a shaft defining a longitudinal axis;

an output gear connected non-rotatable relative to the shaft;

an input gear mounted rotatable relative to and coaxially with the shaft, the input gear defining a first set of holes at a first radial distance from the axis and defining a second set of holes at a second radial distance from the axis, the second radial distance larger than the first radial distance;

a first slip washer mounted non-rotatable relative to and coaxial with the shaft, the first slip washer including a first driven surface located substantially at the first radial distance and facing the input gear in a first axial direction;

a first plurality of balls located partially within the first set of holes and engageable with the first driven surface;

a second slip washer mounted rotable relative to and coaxial with the shaft portion and including a second driven surface located substantially at the second radial distance and facing the input gear in the first axial direction;

a second plurality of balls located partially within the second set of holes and engageable with the second driven surface;

a torque selector mechanism movable between a first position and a second position, in the first position the second slip washer is not rotationally connected to the shaft, and in the second position the torque selector mechanism drivingly connects the second slip washer non-rotatably relative to the shaft;

at least one spring biasing the first set of balls into driving engagement with the first driven surface, and the at least one spring biasing the second set of balls into driving engagement with the second driving surface;

wherein the at least one spring, the first set of balls, and the first driven surface are arranged so as to transmit driving torque from the input gear to the output gear via the first slip washer, when below a first predetermined slip threshold, and the at least one spring, the second set of balls, and the second driven surface are arranged so as to transmit torque from the input gear to the output gear via the second slip washer, when below a second predetermined slip threshold, and the first predetermined torque threshold is lower than the second predetermined torque threshold.

14. The clutch assembly of claim 13 wherein the torque selector mechanism includes a second spring which biases the torque selector mechanism into the first position.

15. The clutch assembly of claim 13 wherein the second slip washer defines a central key hole, and the torque selector mechanism includes a key axially movable relative to but rotationally connected to the shaft, and when the torque selector mechanism is in the second position the key is in the key hole and drivingly connects the second slip washer to the shaft.

16. The clutch assembly of claim 13 wherein the first driven surface is a first circular trough defined by the first axial face of the first slip washer, and the first circular trough has in axial cross section a first profile, and the first profile is arranged so that the first set of balls will ride over the first profile and around the first circular trough, when driving torque exceeds the first predetermined slip threshold.

17. The clutch assembly of claim 16 wherein the second driven surface is a second circular trough defined by the first axial face of the second slip washer, and the second circular trough has in axial cross section a second profile, and the second profile is arranged so that the second set of balls will ride over the second profile and around the second circular trough, when driving torque exceeds the second predetermined slip threshold, and the second profile is different than the first profile.

18. The clutch assembly of claim 13 wherein the first slip washer and the second slip washer are axially fixed relative to the shaft.

19. The clutch assembly of claim 13 wherein the input gear has a first axial face away from the first slip washer and a second axial face towards the first slip washer, and the first set of balls project from the first set of holes beyond the first axial face and the second axial face, and the at least one spring comprises a Belville washer opposite to the first axial face.

20. The clutch assembly of claim 13 wherein second slip washer includes a radially inward annular recess and a radially outward annular side wall, and the first slip washer resides within the recess of the second slip washer, and the side wall of the second slip washer radially outwardly and circumferentially surrounds the first slip washer, and the second driven surface is located on a first axial face of the side wall.

* * * * *